Patented Jan. 2, 1951

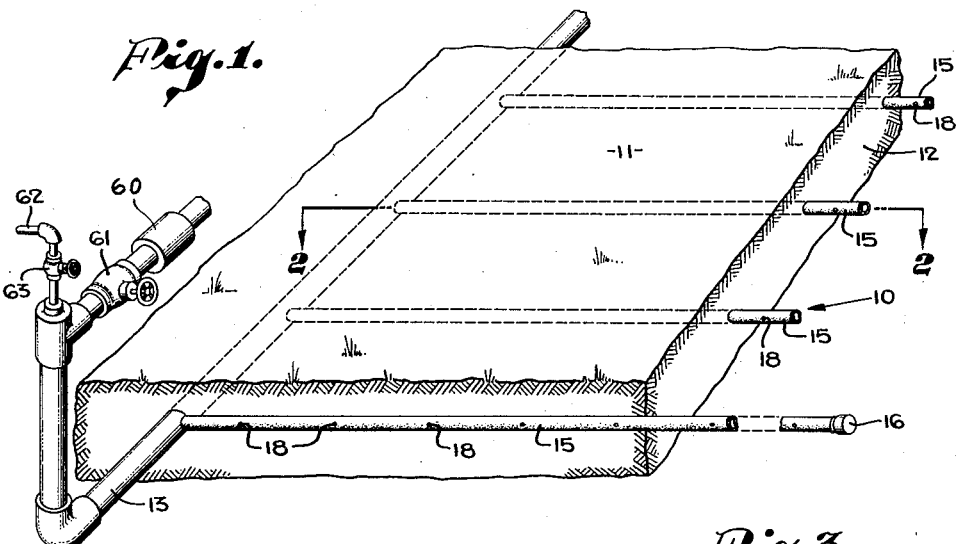

2,536,196

UNITED STATES PATENT OFFICE 2,536,196

SUBSURFACE IRRIGATION SYSTEM

Norman A. MacLeod, Altadena, Calif.

Application January 17, 1948, Serial No. 2,857

13 Claims. (Cl. 61—13)

This invention relates to irrigation systems, and pertains more particularly to irrigation systems intended to discharge irrigating water, which may also contain fertilizer or soil correctives, beneath the surface of the top soil so as to avoid evoporation and run-off and to irrigate more directly and effectively the roots of the plants in the irrigated area.

While it is generally recognized that sub-surface irrigation systems have the above-mentioned advantages over systems employing open ditches or sprinkling devices, they have not been employed in many instances in which they would be beneficial, because of the costs of installation and maintenance and because of inherent difficulties in obtaining even distribution of the irrigating water. To install a system of metallic, earthenware or concrete pipe requires precise planning, the calculation and cutting of exact lengths, allowance for changes in vertical and horizontal directions—in fact, most of the difficulties encountered in laying out a plumbing system—and the digging of a trench system of nearly equal precision. Pipes of iron, which is the cheapest and most practicable metal, are subject to corrosion, concrete and earthenware pipes are subject to crushing, and both are subject to cracking by ice-expansion in climates in which frost penetrates the top soil. Clogging of outlet orifices by roots or sand may easily occur when the velocity of water outflow through the orifices is insufficient to prevent infiltration of root tendrils, as in the case of large orifices without correspondingly high water pressure or the mere porosity of earthenware pipe. Metallic pipe is usually installed with orifices capable of meeting the maximum expected requirements, as such orifices may not thereafter be easily enlarged or increased in number. Where the orifices are not adapted to clear themselves under pressure, the variations in water pressure over an extensive system may be such as to give some areas a deluge of water and other areas a drouth. These irregularities of distribution are not readily detected in a sub-surface irrigating system, except by their deleterious after-effects.

It is accordingly a particular object of this invention to provide an irrigation system which will efficiently distribute water below the soil surface in a manner responsive to changes of water pressure, so as to obviate the need of wasting water at some points to obtain a desired minimum at others and to increase the possibility of uniform plant growth over a large area.

A further object of the invention is to provide an irrigating system relatively easily installed, which may be taken up and relayed at little cost, and which may be layed in furrows made by ordinary cultivating equipment and by unskilled labor, and even coincidentally with planting or with other furrowing operations necessary to cultivation.

Another object of the invention is to provide an irrigating system suitable for irregular terrain, and capable of following the undulations of the terrain either in curved contours or in vertically curved courses at constant depths below an undulating soil surface, and also suitable for curvilinear irrigation of level terrain.

Still another object of the invention is to provide an irrigation system which will have a prolonged life in moist conditions, which will be resistant to corrosion and to damage by freezing, and which will therefore be suitable for use in supplying chemicals to the soil and in cold climates.

A more detailed object of the invention is to provide a sub-surface irrigation system having outlet orifices which contract in the absence of internal pressure to resist the entry of foreign matter such as sand or plant roots, and which expand under the influences of internal pressure to permit ejection of foreign matter that may have entered them.

A further object is to provide a system in which very small outlet orifices can be employed for discharging the water into the soil, without likelihood of becoming clogged by roots or soil particles or by scale encrustation or deposition of sediment, and in which the water may be discharged at high velocity through such orifices, either continuously or intermittently, for the purpose of preventing intrusion of root tendrils or other foreign matter or to expel root tendrils or other foreign matter that may have entered the orifices.

A further object is to provide such a system in which a high water pressure may be maintained in the distributing conduits, considerably in excess of the pressure required to force the water through the length of the conduit, in order to minimize undesired variation in water outflow at different positions along the length of the conduit and, in preferred embodiments of the invention, to cause expansion of the conduit and resultant enlargement of the orifices.

Another object of the invention is to provide aeration of the soil, in conjunction with sub-surface irrigation, by introduction of air into the soil beneath the surface thereof.

A further object is to provide for the displacement of water from a sub-surface irrigating system during periods when the supply of water is discontinued, by introduction of air or other gas into the system under pressure.

Still another object is to provide, if desired, for breaking up or loosening the sub-soil, and promoting the formation of open passages through the soil, in order to improve the soil condition and to facilitate the flow of water out into the soil or upwardly toward the surface, by introducing air or other gas under pressure into the soil through a sub-surface irrigating system during periods when the supply of water is discontinued.

In the preferred practice of this invention, I accomplish the above and other objects of the invention, which will appear or will be specifically pointed out as the description proceeds, by the use of irrigation conduits of flexible elastic material adapted to distend outwardly under the influence of internal hydraulic pressure, and by providing very small outlet orifices through this elastic material, which, in the absence of internal pressure, may be so small as to be substantially closed, and which expand to operating size with the distension of the elastic material. I have found that the soil adjacent to such small orifices will soften when moistened by the initial restricted flow through the orifices and will then yield to permit localized distension of the elastic material at the moist zone so formed, while the remainder of the conduit is relatively undistended. Consequently I have, in one embodiment of my invention, provided for uniform elasticity of the wall material of the conduit, as such a construction is more economical to manufacture, and I have therein relied on localized reduction of external pressure to effect localized distention of the conduit. In other embodiments of my invention I have provided for a differential of elasticity between the wall portions of the conduit immediately adjacent to the outlet orifices and the wall portions more distant therefrom, for the purpose of obtaining localized distension and consequently greater expansion of the orifices. The more rigid wall portions of the conduit may be of flexible material to obtain the advantages resulting from the use of such materials, or may be of material resistant to crushing and cutting, such as metal, if intended for use in proximity to the penetration range of cultivating tools.

Although I prefer to form the conduit wholly or partly of material capable of elastic deformation in such manner as to provide for outward distension thereof adjacent the orifices under internal pressure, with resulting enlargement of the orifices, and subsequent contraction on decrease of internal pressure, the invention in its broader aspects is not restricted to the use of elastically deformable material, as I have found that important advantages can be realized by the use of conduits formed of flexible organic plastic materials having little or no ability to deform elastically under pressure.

I have illustrated the first-mentioned embodiment of my invention, and important modifications thereof in the accompanying drawings, in which:

Fig. 1 is a perspective view of a sub-surface irrigating system embodying the principles of my invention;

Fig. 2 is a horizontal sectional view taken on the line 2—2 of Fig. 1;

Fig. 3 is a vertical sectional view, on an enlarged scale, taken on the line 3—3 of Fig. 2;

Figs. 4, 5 and 6 are views similar to Fig. 3, illustrating important modifications of my invention;

Fig. 7 is another view similar to Fig. 3, illustrating still another modification of my invention and showing in broken lines the distensible wall portion thereof distended as by internal pressure;

Fig. 8 is a further enlarged fragmentary cross-sectional view showing a distended wall portion of the embodiment illustrated in Figs. 1 to 3; and Fig. 9 is a fragmentary cross-sectional view on the scale of Fig. 8, showing a distended wall portion of the embodiment illustrated in Fig. 4, and in effect of the embodiment illustrated in Fig. 5.

It is to be understood that the drawings are diagrammatic in character and do not necessarily represent preferred proportions of wall thickness, internal diameter, depth of submergence below the soil surface, and so forth, the proportions as illustrated being chosen for diagrammatic clarity.

Having reference to the details of the drawings, and particularly to those of Figs. 1 to 3, I have shown a typical sub-surface irrigation system, designated generally by the reference numeral 10, disposed at a suitable depth beneath the surface 11 of soil 12. A header or feeder pipe 13 is provided with a plurality of short nipples 14 to which irrigation conduits or hoses 15 are attached. It will be understood that the arrangement of feeder pipes 13, and the number and method of attachment of the conduits 15 may be varied to suit conditions. A single conduit 15 coupled to a water-supplying member of any character will suffice to embody the principles of my invention, and conversely, when a large area is to be irrigated an elaborate system of interconnected feeder pipes 13 may be installed with any desired number of conduits connected at one or both sides of each feeder pipe. Furthermore, the conduits 15, instead of being closed at their distal ends, as illustrated in Fig. 1 by caps or plugs 16, may be there coupled to another feeder pipe so as to be subjected to hydraulic pressure from both ends.

The conduits 15 are provided with wall portions 17 formed of flexible materials such as rubber or flexible synthetic resins or plastics, and preferably having the additional characteristic of elasticity, that is, the ability to deform elastically under pressure. In the particular embodiment illustrated in Figs. 1 to 3, the walls of conduits 15 are formed of such flexible, preferably elastic, material. Standard sizes of rubber tubing may be utilized for the conduits 15, thereby facilitating connection to standard fittings on the feeder pipes 13 or other supply members, or the diameters of the conduits 15 may be greater or smaller, depending upon the quantity of water which the conduits are intended to distribute and the area of distribution. Long conduits, attached to a feeder only at one end, may be stepped down in diameter as they approach their distal ends. Rubber hose may be of either natural or synthetic rubber and may contain reinforcing fabric if such is desired. Other organic plastic materials of suitable flexibility can also be used, such as plasticized vinyl chloride resins.

Flexible conduits of rubber or synthetic resins and of relatively small size, of the order of one-eighth to one-quarter inch inside diameter, are particularly suitable for irrigating in conditions requiring substantially continuous flow of water over non-repetitive periods of time, as when water-consuming crops are rotated with "dry crops," as such conduits may be easily laid down and picked up at the time of the crop seedings and will supply surprising quantities of water when used continuously under appropriate pressure.

The wall portions 17 of the conduits 15 are pierced at suitable intervals with small orifices 18 preferably arranged to open substantially radially and in lateral and downward directions. Upwardly directed orifices 18 may also be provided if desired, but such orifices are more subject to clogging by granular soil particles and may be eliminated in favor of a greater number of laterally and downwardly opening orifices. The orifices themselves are preferably smooth-walled, and may be formed by piercing the wall with a needle or other sharp instrument, or by drilling or in any other desired manner.

When elastic material, such as rubber is used to form the wall portions 17, the orifices 18 are preferably so small as to be substantially closed when the wall portions 17 are undistended, so as then substantially to exclude granular soil material. For example, with a wall thickness of one-eighth inch of rubber, I have found that orifices formed by piercing with a needle will close so as to preclude the entry of granular particles or root tendrils, and on the other hand will so expand when the conduit is distended by internal hydraulic pressure as to permit a very considerable outflow of water. In the case of flexible synthetic resinous or plastic material of low elasticity, orifices 18 may be of the order of one one-hundredth of an inch or less in diameter, which will permit an outflow velocity sufficient to prevent infiltration of root tendrils when in the recommended continuous use. In either elastic or merely flexible plastic conduits the orifices 18 may if desired be formed after the conduits have been laid and before they are buried, and may be in such number and so spaced as to give the best results for particular conditions.

The conduits 15 will normally be buried in the soil to a depth safeguarding them from being cut by cultivating implements likely to be used, and will be connected to a supply of water under suitable pressure, such pressure being provided either by a pump or by a gravity head of water. Any depth of submergence below the surface of the soil may be provided, for example, from one or a few inches to about a foot for lawns or other cases where the root growth is relatively shallow, or several feet for irrigating orchards or other cases where deep rooting is desired.

Continuous or intermittent irrigation by means of conduits 15 formed of flexible plastic or other substantially non-elastic flexible material, in which the orifices 18 maintain a constant size, will be well understood and is not believed to require extended explanation. The water supplied to the conduits 15 flows longitudinally thereof, and outwardly through the respective orifices into the soil. In order to prevent root tendrils or other foreign matter into the orifices, a relatively high velocity of outflow of water through the orifices, for example, about one foot per second or greater, is preferably maintained. For this purpose, the water is supplied to the system at such pressure that the internal pressure at all points therein will be sufficient to maintain the desired outflow velocity through each orifice. With such a system it is particularly advantageous to maintain continuous flow of water in order to prevent intrusion of roots or other foreign matter into the orifices 18. However, the water may be supplied only intermittently, if desired; or it may be maintained at a relatively low flow rate and the pressure increased for short periods at suitable intervals to flush out the orifices by increased outflow velocity.

When the wall portions 17 are formed of rubber or other elastic material, the wall portions 17 are distended when water is supplied to the conduits 15 under pressure, as illustrated in Fig. 8. External pressure of the soil will at first generally prevent substantial distension of the wall portions 17, but water under pressure will nevertheless seep through the orifices 18 and will moisten the adjacent soil as indicated by darker shading at 20 in Fig. 8, thereby softening the soil and reducing its resistance to movement. The localized reduction of external resistance, when coupled with continuance of substantially uniform internal pressure, will result in localized outward distension of the wall portions 17 encompassing the orifices 18, with accompanying enlargement of the orifices 18 as shown in Fig. 8.

The enlargement of the orifices 18 enables the outflowing water to dislodge from the orifices any granular soil material which may have entered therein and any root tendrils which may have penetrated the orifices. In the absence of local distension the increase in diameter of the orifices 18 would be proportionate only to the increase of diameter of the conduit 15 responsive to substantially uniform internal pressure. However, because a relatively small part of the total wall portion 17 is initially relieved of external pressure due to moistening and softening of the adjacent soil, its distension is correspondingly great and the enlargement of the orifices 18 is proportionate thereto.

When the external soil pressure has been substantially stabilized at a relatively low level, further distension of the orifices 18 will cease when such further distension would cause a drop in internal hydraulic pressure. Thus, for any pressure differential across the orifices 18, a certain maximum outflow is attained which will, by well-known hydraulic laws pertaining to resistance to flow through small orifices, also be at a maximum velocity. Attainment of this maximum velocity is an important factor in dislodging root tendrils.

Water will flow through the enlarged orifices 18 in temporarily increased volume until the soil reaches an aproximately uniform degree of saturation at all points in contact with the conduits 15. The external pressure of the soil will then be equalized, and the uneven distension of the wall portion 17 will tend to cease, and the orifices 18, having been freed of obstructing material will tend to resume their original shape and size, except for such enlargement thereof as results from distension of the conduit as a whole. Those orifices which may have been initially relatively free of obstructing material will have softened the soil in their vicinity more rapidly than other orifices not so free, and will sooner reapproach their original shape and size, thus diverting water flow and pressure to said other orifices to assist in clearing the latter. Consequently the danger is minimized that some orifices will remain clogged, as may happen with orifices of fixed size, creating a drouth in their vicinity while unclogged orifices discharge a flood. When all of the orifices 18 are equally clear of obstructing material, the outflow of water therethrough will be proportionate to the water pressure existing thereat. The water pressure at the header pipe 13 may be regulated by any suitable means, and the pressure drop along each conduit 15 may, if desired, be compensated for by increasing the frequency of occurrence of the orifices 18.

In Fig. 4 I have illustrated a modified form of discharge conduit which may be secured to a header pipe 13 as hereinbefore described. The conduit 22 has a wall portion 23 of elastic material. At spaced positions which may correspond to the orifices 18 in the conduit 17, the wall is reduced in thickness to form recesses 24, which are preferably circular, on the exterior surface of the conduit 22. Each of the recesses 24 is provided with an orifice 25, of a cross-sectional area comparable to or somewhat smaller than that already described in connection with the orifices 18. The wall portions 26 forming the bases of the recesses 24 and immediately adjacent to the orifices 25 are of reduced thickness and are therefore relatively more distensible than the intervening wall portions 23.

The operation of the conduit 22 in response to internal hydraulic pressure is illustrated in Fig. 9. Application of internal hydraulic pressure to the conduit 22 causes distension of the thin distensible wall portions 26 and enlargement of the orifices 25, this localized distension being assisted by the softening of the soil within the recesses 24 by the initial outflow of water through the orifices 25 as indicated by darker shading at 27. The distension of the wall portions 26 is not, in this instance, due entirely to localized differentiation of internal and external pressure but is in part due to the differing ability of the wall portions 23 and 26 to withstand such distension; therefore some distension of the wall portions 26 will continue during irrigation and therefore the initial or undistended size of the orifices 25 is preferably somewhat smaller than in the case of the orifices 18, if intended for similar service, in order that the sizes during irrigation may be comparable.

Two further modifications of my invention are illustrated in Figs. 5 and 6 in which the discharge conduits are formed of inner and outer annular layers of differing elasticity. In Fig. 5 a conduit 30 is formed with an outer annular layer 31 of flexible but relatively indistensible material and an inner layer 32 of flexible and relatively distensible material, such as natural or synthetic rubber. The outer layer 31 is provided with large recesses 33 and the inner layer 32 is provided with relatively small orifices 34, preferably substantially concentric with the recesses 33. The recesses 33 and orifices 34 correspond in function and may suitably correspond in size to the recesses 24 and orifices 25 hitherto described. Where they overlap, the layers 31 and 32 form a relatively inelastic wall portion 35, resistant to distension by internal hydraulic pressure; and the inner layer 32 forms elastic window coverings or wall portions 36 across the recesses 33, perforated by the orifices 34.

The modified embodiment of my invention illustrated in Fig. 6 differs from the form shown in Fig. 5 and described above in that the annular layers of the conduit 40 are reversed with respect to their elasticity, the outer annular layer 41 being of relatively distensible material such as rubber, and the inner layer 42 being flexible but relatively indistensible, the two layers where overlapping forming a relatively inelastic wall portion 43. The inner layer 42 is provided with recesses 44 extending therethrough and covered externally by the outer layer 41 which there forms a distensible wall portion 45, perforated by small orifices 46 which may be concentric with the recesses 44.

In both of the last-described modifications of my invention the inner and outer layers of wall material are preferably united to form an integral structure, such construction being preferable as being more economical to manufacture and having no inter-layer interstices for the lodgement of water or soil. It is to be understood, however, that the layers may be in the form of separate tubes, drawn one over the other, as the elasticity of the tubes may be availed of to provide in effect a unified structure.

The operation of the modification illustrated in Fig. 5 is substantially the same as that of the form shown in Figs. 4 and 9, and the operation of the modification shown in Fig. 6 differs therefrom only in that the initial outflow of water moistens and softens a soil zone wholly exterior to the conduit 40 instead of a zone lying partly within a recess. In both instances, because the distension of the more distensible wall portions 36 or 45 will continue while water pressure for irrigation continues within the conduits, the orifices 34 or 46 are made to be iintially smaller than their intended size during irrigating operations.

Furthermore, as regards the modification illustrated in Fig. 6, the orifices 46 are not necessarily aligned with the recesses 44 when the outer layer 41 is a separate tube drawn over the inner layer 42. Internal hydraulic pressure, distending the more distensible outer layer 41 will force water to penetrate between the layers 42 and 41 and to seek the orifices 46 wherever they may be relatively to the recesses 44.

Still another modification of my invention is illustrated in Fig. 7 in which is shown a conduit 50 having a wall portion 51 of metal or other rigid and relatively inelastic material provided with one or more windows 52 covered with an elastic window covering or wall portion 53. Preferably the window 52 extends longitudinally of the conduit 50 on the lower side thereof, but a plurality of windows may be substituted therefor and such windows may be disposed in any suitable manner. The preferred construction of a single elongated window permits the use, for the wall portion 51, of sheet metal rolled to tubular form and having outwardly turned flanges 54 bordering the window 52, to which the elastic covering 53 may be secured by a simple crimping operation. The window covering or coverings 53 are preferably made of natural or synthetic rubber and are perforated with one or more small orifices 55 relatively minute in cross-sectional area compared with the cross-sectional area of the coverings. Due to the inelasticity of the wall portion 51, the distension resulting from internal hydraulic pressure is localized at the window or windows 52, causing the covering or coverings 53 to distend as shown in broken lines at 53' in Fig. 7, thus causing a substantial enlargement of each orifice as indicated at 55'. The localized distension is of an order permitting the orifices 55 to be so small as to be substantially closed in the absence of internal pressure and yet permitting ample outflow through the orifices under pressure.

In view of the smallness of the orifices in the various above-described forms of my invention, and the possibility that they may become plugged by sediment carried by the irrigating water, it is desirable to provide a filter trap 60 which may be incorporated at any accessible point in the header or feeder pipe 13, and may be of any suitable form.

All of the above-described conduits embodying my invention may be layed out on the terrain which they are to irrigate while still unprovided with orifices for the outflow of water. When trenches have been dug in the pattern of the proposed irrigating system, the conduits may be layed in the trenches but left temporarily uncovered. After water has been admitted under pressure to the conduits, orifices may be formed by piercing or otherwise, as described above, at such intervals and in such numbers as are requisite to obtain the best distribution of water. For example, at points distant from the supply pipes 13 or elevated thereabove so that the water pressure in the conduits is diminished, a greater number of orifices may be formed at relatively close spacings so as to vent a quantity of water comparable to that vented at points where the water pressure is higher or at depressions in the terrain which naturally collect water and where the water pressure is augmented by static head, while a lesser number of orifices at relatively large spacings may be formed at such position of relatively high pressure. The number and spacing of the orifices may also be varied, if desired, to provide for supply of water at selected positions in the area covered, for example, near or around the roots of trees in an orchard. It will be observed that in those forms of my invention having large outer openings such as openings 24 and 33, it is not necessary to form an orifice at every opening, but only at such openings as will best suit the requirements of irrigation. When a satisfactory irrigating flow has been established, the conduits may be buried in the trenches, with confidence that the so-formed orifices will not become clogged and that the tested conditions of flow may be continued.

As rubber has a well-known ability to resist decomposition when kept in damp, dark conditions, the rubber wall portions incorporated in my invention will retain their elasticity through long periods of use. Such wall portions will also distend to relieve internal pressure caused by freezing of water within the conduits, and therefore are particularly adapted for use in regions where freezing temperatures are encountered. Rubber and synthetic resinous wall portions are also adapted for use when it is desired to supply the soil with water-soluble fertilizing agents conveyed to the soil through the sub-surface irrigation system, as they are not ordinarily subject to chemical attack by such agents.

The flexible forms of my invention illustrated in Figs. 3, 4, 5 and 6, may be layed from a reel and may be conveniently layed when the soil is being seeded or otherwise cultivated by ground-breaking operations. The trenches for them may follow the contours of the terrain in horizontally curved level courses, or may rise and fall in vertically curved courses with undulations of the terrain, in either case providing a constant sub-surface depth for the flexible conduits. If unexpected obstacles such as large boulders are encountered the conduits may be easily bent around them, no special elbows or other fittings being required.

It will be evident from the foregoing description that the walls of the conduits are formed wholly or partly of material which in tubular form is flexible so as to be capable of deformation by bending or rolling, or upon application of internal pressure, and is preferably also elastic or resilient in nature so as to tend to return to its original position upon removal of the internal pressure or other deforming force.

In a system such as described above, using any of the illustrated forms of flexible conduit provided with orifices, the flow of water may be maintained continuously over long periods in cases where such continuous supply of water to the soil is desirable, and the continuous outflow of water is of advantage in preventing entry of root tendrils or other foreign matter into the orifices or into the interior of the conduit, particularly when the orifices are so small that a high velocity of water outflow therethrough can be maintained without an excessive consumption of water and without supplying too great a quantity of water to the soil for satisfactory plant growth. I prefer to maintain the water pressure at all points in the conduit or conduits sufficiently high to provide a high outflow velocity at each orifice, such velocity being preferably about ten feet per second or greater.

However, continuous water flow is not essential, and in some cases may be undesirable for optimum plant growth conditions. In such cases, the flow may be continued for a period sufficient to supply to the soil a desired amount of water, and may then be shut off until such time as further irrigation is desired, when the flow may be resumed. When the flow of water is resumed, the outflow of water through the orifices will serve to dislodge and eject from the orifices any roots or other foreign matter that may have entered the orifices during the time the flow was shut off, particularly when the conduits, or the wall portions thereof adjacent the orifices, are formed of resilient material capable of elastic deformation so as to cause distension or expansion of the wall portions adjacent the orifices and resultant enlargement of the orifices under the internal water pressure, as described above.

The feeder pipe 13 is shown as provided with a valve 61 which may be used to shut off the water flow when desired as well as to regulate the rate of flow.

I also prefer to provide means for introducing air or other gas into the system, for distribution through the flexible conduits and the orifices therein, into the soil below the surface. For this purpose I have shown an air or gas supply pipe 62 provided with a valve 63, connected to the feeder pipe 13 between valve 61 and conduits 15.

When the water supply is shut off at valve 61, and with pipe 62 connected to a source of air or other gaseous medium at suitable super-atmospheric pressure, valve 63 may be opened to cause such gaseous medium to pass through feeder pipe 13 and the flexible conduits and substantially completely displace water therefrom. The displaced water is thus forced out into the soil through the orifices in the conduits, leaving the interior of the conduits and the orifices substantially dry and thereby preventing or reducing the likelihood of root intrusion into the orifices, which would be encouraged if water were permitted to stand in the pipes after the flow is shut off.

The supply of gaseous medium may, if desired, be continued after the water is displaced from the system, to cause outflow of such gaseous medium through the water outflow orifices and into the soil below the surface, for the purpose of forming relatively open channels or passages through the soil so as to facilitate permeation of water through such passages and out into the soil or upwardly toward the surface during a subsequent irrigating period. The introduction of air or gas into the soil below the surface in this manner may be practiced whenever desired, for the purposes mentioned above or for other reasons, such as for the purpose of loosening or breaking up the sub-soil or otherwise improving the condition thereof.

Furthermore, air may be supplied to the soil through the sub-surface orifices of the system, as described above, for the purpose of aerating the soil. This is believed to be quite beneficial in cases where access of some air to the soil in the region of root growth and development is particularly desirable, since such sub-surface aeration may be useful to compensate for a deficient supply of air in solution in the water. When water is supplied to the soil by ordinary surface irrigation methods, the water so supplied is exposed to the air at the surface of the soil so as to dissolve an appreciable quantity of air which is thus carried into the soil. However, this aerating action does not occur in sub-surface irrigation, except for such air as is contained in the water supplied to the system, and additional separate aeration as described above may therefore be essential or important in some cases. Such aeration of the sub-soil will reduce or eliminate the necessity of deep cultivation so that subsequent crops can be planted without disturbing the conduits.

Numerous modifications may be made in the application of the principles of the present invention, hence I do not choose to be limited to the above-described examples, but rather to the scope of the appended claims.

I claim:

1. In a sub-surface irrigation system: a conduit extending beneath the surface of the sail and formed of a flexible tube having inner and outer layers of differing distensibility, the layer of lesser distensibility having relatively large recesses, and the layer of greater distensibility having relatively small orifices communicating with said recesses.

2. In a sub-surface irrigation system, a conduit extending beneath the surface of the sail and formed of flexible material, and having an annular portion distensible under internal hydraulic pressure and provided with a plurality of small orifices therethrough, the wall portions of said conduit adjacent said orifices defining recesses into which said orifices admit and of such depth as to cause said orifice to be defined marginally only by said annular portion.

3. In a sub-surface irrigation system: a conduit extending beneath the surface of the soil and comprising an inner tube of relatively inelastic material, and an outer tube of relatively elastic material adapted to distend under internal hydraulic pressure; said inner tube having a plurality of relatively large openings spaced so as to provide inter-opening wall portions resistant to distension, and said outer tube having small orifices communicating with said relatively large openings.

4. In a sub-surface irrigation system: a conduit extending beneath the surface of the soil and comprising an outer tube of material adapted to distend under internal hydraulic pressure, and an inner tube; said inner tube having radial openings, and said outer tube having relatively small orifices communicating with said openings.

5. In a sub-surface irrigation system: a conduit extending beneath the surface of the soil and having a wall composed in part of an elastic material and in part composed of a relatively less elastic material; said elastic material forming window means between the interior and exterior of said conduit distensible under internal hydraulic pressure, said window means being provided with an orifice whose cross-sectional area is minute relative to the imperforate area thereof.

6. A sub-surface irrigation system comprising: a conduit extending beneath the surface of the soil and substantially parallel thereto having a wall of non-resilient material and having a window in the lower portion of said wall; and a closure for said window of elastic material distensible under internal hydraulic pressure and having orifice means of cross-sectional area minute in relation to the cross-sectional area of said closure.

7. A sub-surface irrigation system as described in claim 6, in which said window is elongated longitudinally of said conduit, and said orifice means comprising a plurality of small orifices spaced longitudinally of said closure.

8. In a sub-surface irrigation system: a conduit extending beneath the surface of the soil and having a plurality of separate small openings extending through the wall thereof and spaced from each other, said conduit being composed at least in part of flexible resilient material capable of elastic outward distension under internal hydraulic pressure, said flexible resilient material completely surrounding each of said openings to form margins surrounding openings distensible outwardly under such pressure to cause enlargement of said openings.

9. In a sub-surface irrigation system: a conduit extending beneath the surface of the soil and having a plurality of separate small openings extending through the wall thereof and spaced from each other, the portions of the wall of said conduit adjacent said openings being composed of flexible resilient material capable of elastic outward distension under internal hydraulic pressure, said wall portions completely surrounding each of said openings and being distensible outwardly under such pressure to cause enlargement of said openings.

10. In a sub-surface irrigation system: a conduit extending beneath the surface of the soil and formed of flexible resilient material capable of elastic outward distension under internal hydraulic pressure, said conduit having a plurality of separate small openings extending through the wall thereof and spaced from each other, said flexible resilient material completely surrounding each of said openings and being distensible outwardly under such pressure to cause enlargement of said openings.

11. In a sub-surface irrigation system: a conduit as set forth in claim 10, in which each of said openings is of substantially uniform cross section throughout its length.

12. In a sub-surface irrigation system: a conduit extending beneath the surface of the soil and formed of flexible plastic material distensible outwardly under internal hydraulic pressure and having a plurality of separate small orifices spaced from each other extending radially through the wall of said conduit, the portions of the wall of said conduit adjacent said orifices completely surrounding each of said orifices and having greater distensibility than the remaining portions of the wall between said adjacent portions.

13. In a sub-surface irrigation system: a conduit extending beneath the surface of the soil and formed of flexible plastic material distensible outwardly under internal hydraulic pressure and provided with a plurality of separate small orifices extending through the wall of said conduit and spaced from each other, said flexible plastic material completely surrounding each of said openings and being distensible outwardly under such pressure to cause enlargement of said openings.

NORMAN A. MacLEOD.

REFERENCES CITED

The following references are of record in the file of this patent:

UNITED STATES PATENTS

| Number | Name | Date |
|---|---|---|
| 1,015,401 | Robison | Jan. 23, 1912 |